United States Patent
Skiba et al.

(10) Patent No.: US 9,715,492 B2
(45) Date of Patent: Jul. 25, 2017

(54) UNSPOKEN SENTIMENT

(71) Applicant: Avaya, Inc., Basking Ridge, NJ (US)

(72) Inventors: David Skiba, Golden, CO (US);
George Erhart, Loveland, CO (US);
Lee Becker, Boulder, CO (US);
Valentine C Matula, Granville, OH (US)

(73) Assignee: Avaya Inc., Basking Ridge, NJ (US)

( * ) Notice: Subject to any disclaimer, the term of this patent is extended or adjusted under 35 U.S.C. 154(b) by 422 days.

(21) Appl. No.: 14/024,334

(22) Filed: Sep. 11, 2013

(65) Prior Publication Data
US 2015/0073775 A1    Mar. 12, 2015

(51) Int. Cl.
*G06F 17/27* (2006.01)
*G06F 17/10* (2006.01)
*G05B 13/04* (2006.01)
*H04N 21/25* (2011.01)

(52) U.S. Cl.
CPC ....... *G06F 17/2785* (2013.01); *G05B 13/048* (2013.01); *G06F 17/10* (2013.01); *G06F 17/27* (2013.01); *H04N 21/251* (2013.01)

(58) Field of Classification Search
USPC .......................................................... 706/55
See application file for complete search history.

(56) References Cited

U.S. PATENT DOCUMENTS

| | | | |
|---|---|---|---|
| 6,879,668 B2 | 4/2005 | Neuwald et al. | |
| 7,903,801 B1 | 3/2011 | Ruckart | |
| 7,912,720 B1 | 3/2011 | Hakkani-Tur et al. | |
| 7,983,910 B2 | 7/2011 | Subramanian et al. | |
| 7,996,210 B2 | 8/2011 | Godbole et al. | |
| 8,010,539 B2 | 8/2011 | Blair-Goldensohn et al. | |
| 8,111,813 B2 | 2/2012 | Weber et al. | |
| 8,352,405 B2 | 1/2013 | Fang et al. | |
| 8,463,594 B2 | 6/2013 | Au | |
| 8,463,606 B2 | 6/2013 | Scott et al. | |
| 8,600,858 B1 * | 12/2013 | Kamruddin | G06Q 40/06 705/35 |
| 8,700,480 B1 | 4/2014 | Fox et al. | |
| 8,719,178 B2 * | 5/2014 | Zhang | G06Q 30/02 705/319 |
| 8,838,633 B2 | 9/2014 | Dhillon et al. | |
| 8,972,379 B1 | 3/2015 | Grieselhuber et al. | |
| 9,020,135 B2 * | 4/2015 | Skiba | H04M 3/5175 379/265.01 |
| 9,432,325 B2 * | 8/2016 | Skiba | H04M 3/5175 |

(Continued)

OTHER PUBLICATIONS

Reyes12, A multidimensional approach for detecting irony in Twitter Springer Science+Business Media B.V. [online], 2012 [retrieved on Oct. 26, 2015]. Retrieved from the Internet<URL:http://link.springer.com/content/pdf/10.1007%Fs10579-012-9196-x.pdf>.*

(Continued)

*Primary Examiner* — Michael B Holmes
(74) *Attorney, Agent, or Firm* — Sheridan Ross P.C.

(57) ABSTRACT

The sentiment of a message may not be obtainable from the message itself. However, many messages have an associated context that provides information useful in determining the sentiment of a message. Messages may include links to other resources, such as graphics or videos, which in turn include titles, comments, viewer ratings or other attributes that may provide a sentiment of the message.

20 Claims, 4 Drawing Sheets

(56) References Cited

U.S. PATENT DOCUMENTS

| | | | |
|---|---|---|---|
| 9,438,732 B2* | 9/2016 | Skiba | H04M 3/5175 |
| 9,451,085 B2* | 9/2016 | Skiba | H04M 3/5175 |
| 9,542,455 B2* | 1/2017 | Skiba | H04L 51/32 |
| 2005/0125216 A1 | 6/2005 | Chitrapura et al. | |
| 2007/0064882 A1 | 3/2007 | Ger et al. | |
| 2009/0306967 A1 | 12/2009 | Nicolov et al. | |
| 2009/0319342 A1 | 12/2009 | Shilman et al. | |
| 2010/0050117 A1 | 2/2010 | Sherrard et al. | |
| 2010/0119053 A1 | 5/2010 | Goeldi | |
| 2010/0312769 A1 | 12/2010 | Bailey et al. | |
| 2011/0002451 A1 | 1/2011 | Moran et al. | |
| 2011/0013756 A1 | 1/2011 | Davies et al. | |
| 2011/0078167 A1 | 3/2011 | Sundaresan et al. | |
| 2011/0191693 A1 | 8/2011 | Baggett et al. | |
| 2011/0207437 A1 | 8/2011 | Richardson et al. | |
| 2012/0046938 A1 | 2/2012 | Godbole et al. | |
| 2012/0143683 A1 | 6/2012 | Hertz et al. | |
| 2012/0245925 A1 | 9/2012 | Guha et al. | |
| 2012/0246104 A1 | 9/2012 | Di Sciullo et al. | |
| 2012/0259616 A1 | 10/2012 | Peng et al. | |
| 2012/0278064 A1 | 11/2012 | Leary et al. | |
| 2012/0296845 A1 | 11/2012 | Andrews et al. | |
| 2013/0046756 A1 | 2/2013 | Hao et al. | |
| 2013/0103386 A1 | 4/2013 | Zhang et al. | |
| 2013/0103623 A1 | 4/2013 | Burstein et al. | |
| 2013/0124191 A1 | 5/2013 | Louis et al. | |
| 2013/0173254 A1 | 7/2013 | Alemi | |
| 2013/0204613 A1 | 8/2013 | Godbole et al. | |
| 2013/0218640 A1 | 8/2013 | Kidder et al. | |
| 2013/0231975 A1 | 9/2013 | High et al. | |
| 2013/0311485 A1 | 11/2013 | Khan | |
| 2013/0325877 A1 | 12/2013 | Niazi | |
| 2014/0019118 A1 | 1/2014 | Tromp | |
| 2014/0058721 A1 | 2/2014 | Becerra | |
| 2014/0095148 A1 | 4/2014 | Berjikly et al. | |
| 2014/0180788 A1 | 6/2014 | George et al. | |
| 2014/0189536 A1 | 7/2014 | Lange et al. | |
| 2014/0237057 A1 | 8/2014 | Khodorenko | |
| 2014/0282934 A1 | 9/2014 | Miasnik et al. | |
| 2014/0304264 A1 | 10/2014 | Hailpern et al. | |
| 2014/0304343 A1 | 10/2014 | Skiba et al. | |
| 2014/0365213 A1 | 12/2014 | Totzke | |

OTHER PUBLICATIONS

Spertus, Smokey: Automatic Recognition of Hostile Messages, IAAI-97 Proceedings [online], 1997 [retrieved on Jun. 25, 2016]. Retrieved from the Internet:<URL:hhttps://www.aaai.org/Papers/IAAI/1997/IAAI97-209.pdf>.*

Unlock big data emotions: Weighted word embeddings for sentiment classification Xiangfeng Dai; Bob Prout 2016 IEEE International Conference on Big Data (Big Data) Year: 2016 pp. 3833-3838, DOI: 10.1109/BigData.2016.7841056 IEEE Conference Publications.*

Chinese Sentence-Level Sentiment Classification Based on Sentiment Morphemes Xin Wang; Guohong Fu 2010 International Conference on Asian Language Processing Year: 2010 pp. 203-206, DOI: 10.1109/IALP.2010.21 IEEE Conference Publications.*

Dissemination Patterns and Associated Network Effects of Sentiments in Social Networks Robert Hillmann; Matthias Trier 2012 IEEE/ACM International Conference on Advances in Social Networks Analysis and Mining Year: 2012 pp. 511-516, DOI: 10.1109/ASONAM.2012.88 IEEE Conference Publications.*

Sentiment-Based Identification of Radical Authors (SIRA) Ryan Scrivens; Garth Davies; Richard Frank; Joseph Mei 2015 IEEE International Conference on Data Mining Workshop (ICDMW) Year: 2015 pp. 979-986, DOI: 10.1109/ICDMW.2015.64 IEEE Conference Publications.*

U.S. Appl. No. 13/594,283, filed Aug. 24, 2012.

U.S. Appl. No. 14/020,674, filed Sep. 6, 2013.

U.S. Appl. No. 14/023,967, filed Sep. 11, 2013.

U.S. Appl. No. 14/146,527, filed Jan. 2, 2014.

Blair-Goldensohn et al., "Building a Sentiment Summarizer for Local Service Reviews," WWW Workshop on NLP in the Information Explosion Era, 2008, vol. 14, 10 pages.

Glance et al., "BlogPulse: Automated Trend Discovery for Weblogs," WWW Workshop on the Weblogging Ecosystem: Aggregation, Analysis and Dynamics, 2004, New York, 8 pages.

Neviarouskaya et al., "Textual Affect Sensing for Sociable and Expressive Online Communication," ACII 2007, LNCS 4738, 2007 Springer-Verlag, pp. 218-229.

Zhe et al., "Text-to-Emotion Engine for Real Time Internet Communication," Networks and DSPs, 2002, pp. 164-168.

Official Action for U.S. Appl. No. 13/594,283, mailed Dec. 3, 2015 21 pages.

Official Action for U.S. Appl. No. 14/020,674, mailed Dec. 3, 2015 22 pages.

Official Action for U.S. Appl. No. 14/021,889, mailed Jan. 14, 2016 13 pages.

"Verint Extends Customer Interaction Analytics Portfolio with Addition of Sentiment and Text Analytics Software," Verint System Inc., Sep. 29, 2010, 3 pages [http://www.verint.com/news-events/press-releases/2010-pr-archives/09_29_2010.html].

Devillers et al. "Annotation and Detection of Emotion in a Task-oriented Human-Human Dialog Corpus," ISLE workshop, Dec. 2002, 10 pages.

Meng et al. "Cross-Lingual Mixture Model for Sentiment Classification," Proceedings of the 50th Annual Meeting of the Association for Computational Linguistics, Jeju, Republic of Korea, Jul. 8-14, 2012, pp. 572-581.

Official Action for U.S. Appl. No. 14/021,889, mailed Aug. 12, 2015 5 pages.

U.S. Appl. No. 14/020,674, filed Sep. 6, 2013, Skiba et al.

U.S. Appl. No. 14/021,889, filed Sep. 9, 2013, Skiba.

U.S. Appl. No. 14/023,967, filed Sep. 11, 2013, Becker et al.

U.S. Appl. No. 14/146,527, filed Jan. 2, 2014, Mohler.

"Contact Center Text Analytics," Verint, Inc., 2012, 1 page [retrieved from: http://verint.com/contact_center/section2a.cfm?article_level2_category_id=21&article_level2a_id=345].

"Avaya Delivers Social Media Solutions to Drive Superior Customer Experiences," AVAYA, Jul. 2011, 1 page [retrieved from: http://www.avaya.com/usa/about-avaya/newsroom/news-releases/2011/pr-110712a].

* cited by examiner

UNSPOKEN SENTIMENT

FIELD OF THE DISCLOSURE

The present disclosure is generally directed toward determining the sentiment of a message. In particular, identifying and utilizing the sentiment of a context associated with the message and, therefore, determine the sentiment of the message itself.

BACKGROUND

Automatic means to determine the sentiment of the content of a message provide a useful and efficient means for an enterprise, such as a contact center, to identify issues and direct resources to those issues accordingly. An explicit message text, (e.g., "The service on XYZ Airlines was terrible") provides one means to determine the sentiment of a message. For example, messages that include the word, "terrible," may be determined to be negative. Additional sentiment determination means is provided by U.S. patent application Ser. No. 13/594,283 filed on Aug. 24, 2012, entitled, "Real Time Statistics for Contact Center Mood Analysis Method and Apparatus."

Messages are not always explicitly expressed in the text of the message. As a result, the sentiment of the message may not be determinable by the explicit content of the message.

SUMMARY

It is with respect to the above issues and other problems that the embodiments presented herein were contemplated.

Sentiment analysis is the application of text analytics, computational linguistics, and natural language processing to determine subjective information from a source communication. In general, the goal of sentiment analysis is to figure out the attitude of the person who created the communication and use that information to respond to the communication.

Part of basic sentiment analysis is determining the polarity of a communication, meaning it is positive, negative, or neutral. Another part of basic sentiment analysis is scoring concepts within the communication to understand the strength of the language used. Difficulties arise in identifying relevant communications, extracting particularly relevant aspects of the communications, and determining polarity.

In one embodiment, a model behavior or action-based attributes of communication to derive or adjust sentiment and actionable qualification values. In social media within a customer support settings, various actions can serve as proxies of negative sentiment. For example, heavily liked, shared, or retweeted items often convey negative sentiment. Similarly, uptake or response to a tweet from a company of interest may serve as evidence of negative polarity. Tweeting or posting of links to multimedia objects can be an implicit sentiment statement as well (e.g., a posting of a partially opened sardine can when discussing an airline flight). Automatic classification of customer language for likely action (likes, shares, retweets) by other customers or for response by the company (uptake) can thus determine customer sentiment.

The system may then utilize this additional sentiment information to indicate cases of focus for the contact center and provide trending velocity for a given communication. Rapidly increasing negative sentiment could be automatically detected here where the text analysis would only give the basic negative sentiment or may even indicate neutral sentiment. In the sardine can example from above, the text might be just a neutral, "Here's a picture from my last flight," while the picture, properly analyzed (or via analysis of a caption, etc.) alludes to a cramped situation.

In one embodiment, a salesperson posts on their Facebook wall "busy day at work." There are several likes and a comment that posts a link to an image of dollar signs. The image has the tag or file name "money." The system would be able to detect this is a positive sentiment. If this poster was followed by a company, such as a luxury car manufacturer, then the car manufacturer may want to add this person to their next mailing.

In another embodiment, a customer posts on an airline's page "typical food on XYZ Airlines." This statement does not indicate sentiment with the text alone. Several people may like this post, which is also inconclusive by itself. However, if the post also includes a link to a YouTube video with images of awful food. The actual words don't indicate the sentiment but the YouTube video and likes are indicators that this is a very negative communication.

In a further embodiment, the video itself may be determined to contain images of awful food—or at least content with a negative sentiment—based upon the title, comments provided by the poster of the video, viewer comments, and/or links to additional content.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
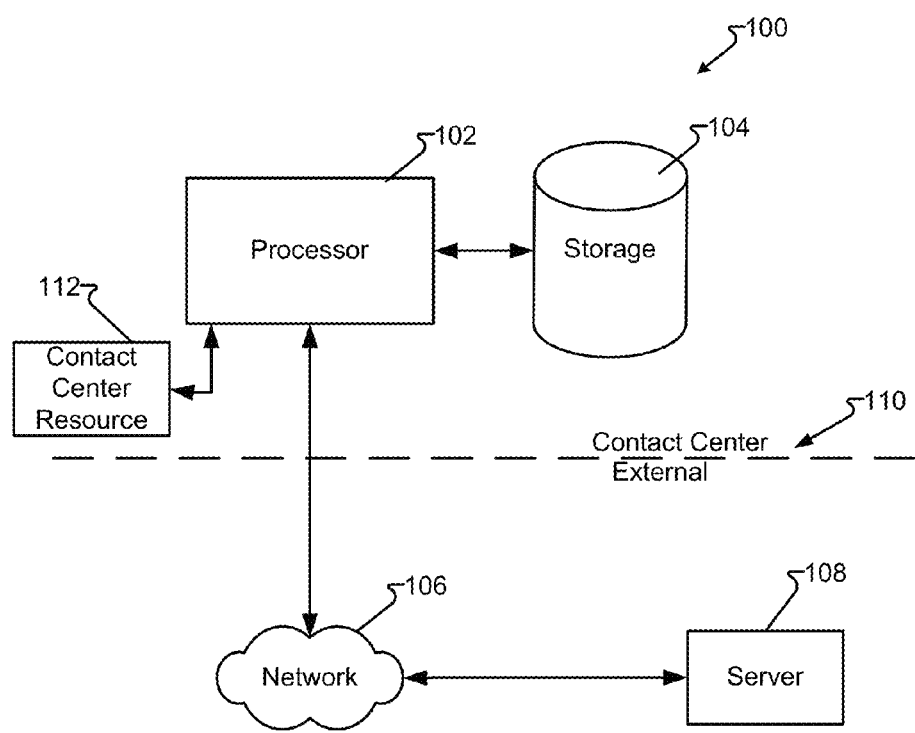
FIG. 1 is a system diagram in accordance with embodiments of the present disclosure.

FIG. 1 is system diagram 100 in accordance with embodiments of the present disclosure. In one embodiment, system 100 includes processor 102, storage 104, and server 108. Server 108 being accessible to processor 102 via network 106. In another embodiment, storage 104 is omitted and data is provided via server 108. In yet another embodiment, server 108 is omitted and storage is provided by storage 104. Network 106 may be implemented as a public network (e.g., the Internet), private network, bus, inter/intra processor connection, or other means operable to facilitate data exchange between processor 102 and components, such as storage 104 and server 108, to components having or receiving information.

In another embodiment, processor 102, storage 104, and contact center resource 112 are internal to a contact center, represented by line 110. Contact center resource 112 is operable to address concerns, such as one or more messages with a certain, typically negative, sentiment. Line 110 may represent a physical and logical division between a contact center and external systems. In other embodiments, line 110 is organizational and contact center resource and/or storage 104 may utilize network 106 and/or other public or private networks.

In another embodiment, processor 102 selects a message. The message may be selected from a live stream, such as when server 108 is a user directly sending messages via network 106 to processor 102, such as by email, SMS, or other messaging service. In other embodiments, server 108 is a social media website being monitored by processor 102 and/or other processors and/or processes. Social media websites include websites operable receive posts from users, Twitter, Facebook, YouTube, RSS feeds, and similar services where users can post media files, links, comments, and other information.

With processor 102 having a message, processor 102 may then select a context associated with the message. The context, as used herein, is variously embodied. In one embodiment, the context is embedded within the message, such as a media file, or other content. In another embodiment, the context is content associated with the message, such as by following a link (e.g., URL) to a website whereby the context may include comments from the poster of the media, title of the media, keywords, metatags, and viewer and/or user comments. In a further embodiment, the context may be implied based on certain actions of users. As one example, due to human nature, a positive comment, such as, "I like to fly on XYZ Airlines," will likely not receive as many endorsements as the negative comment, "I hate to fly on XYZ Airlines."

In yet a further embodiment, once a sentiment trend and/or severity has been determined, contact center may cause processor 102 to direct contact center 112 to address the issue. Contact center resource 112 may be an automated and/or human agent to and may further identify the root cause of the issue, explain extenuating circumstances, provide a remedy to dissatisfied customers, or otherwise assist a customer of the contact center (e.g., XYZ Airlines) in servicing its customers.

Figure 2:
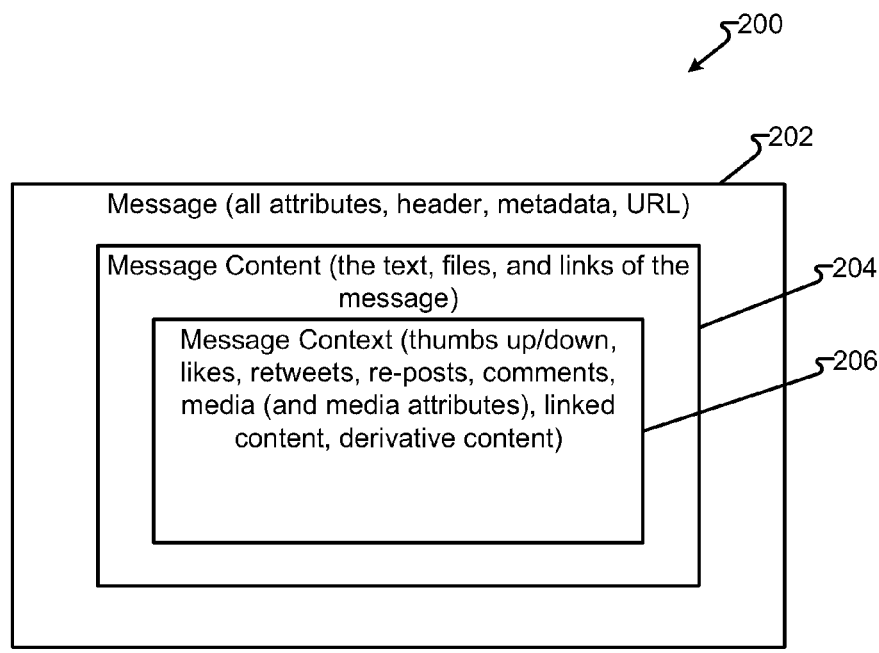
FIG. 2 is a block diagram in accordance with embodiments of the present disclosure.

FIG. 2 is block diagram 200 in accordance with embodiments of the present disclosure. Diagram 200 is a conceptual illustration of one embodiment of message 202. Message 202 includes attributes such as header, location (e.g., URL), date, and message content 204. Message content 204 is the message itself (e.g., text) and any additionally supplied content from creator of message 202, such as links and embedded files. Associated with the message content is message context 206. Message context 206 may reside within message 202, such as when message 202 includes embedded files. For example, a file embedded in message 202 may have the file name, "rotten_fish.jpg," and, accordingly be associated with a negative sentiment.

In other embodiments, message context 206 is determined by tracing one or more links embedded in message 202 to a secondary source. The secondary source providing information such as uptakes, "likes," "shares," "re-tweets," and other endorsements or actions intended to propagate and/or lend credibility to a position such as links and derivative content.

Message context 206 may or may not be visible to a user. Links, such as bitly.com, Facebook.com, LinkedIn.com, or other tracking service, may count hits or perform other operations to provide message context 206, without being visible to the user.

Figure 3:
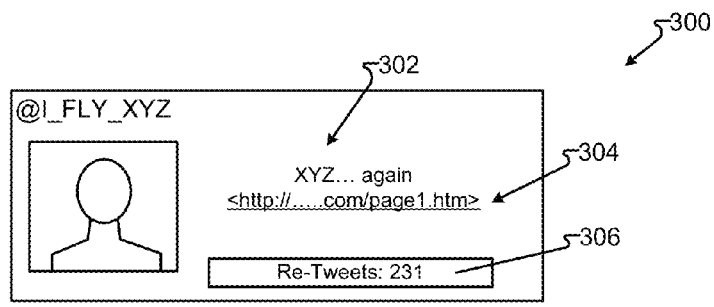
FIG. 3 is a message, in the form of a post on a social media site, in accordance with embodiments of the present disclosure.

FIG. 3 is message 300, in the form of a post on a social media site, in accordance with embodiments of the present disclosure. In other embodiments, message 300 may be a "Tweet," a comment, an email, a blog entry, an RSS entry, or other means of presenting and/or sending a message.

In one embodiment, message 300 includes text 302 and message content 304. Text 302 may be sentiment indicative or sentiment neutral. Message content 304 is a link to a webpage (see, FIG. 4). In another embodiment, message 300 includes indicator 306. Indicator 306 provides an indication of how well endorsed the position of message 300 is to other viewers of message 300. The specific threshold as to what is a strong indication and/or a weak indication is a matter of design choice and may further depend on the topic. For example, in one embodiment, message 300 was directed towards the subject of airline delays, a generally popular topic. If then indicator 306 had a low value over a certain amount of time, it may be concluded that the position of message 300 is not of interest to those viewing message 300. Reason message 300 may indicate the position of message 300 is not widely shared, message 300 is off-topic, or other issue whereby viewers of message 300 are substantially ambivalent to making any endorsement of message 300.

In other embodiment, indicator 306 may be a relatively high number over a relatively short period of time. Accordingly, such indicator 306 may be interpreted as being associated with message 300 of a particularly serious, well supported, widely experienced, or otherwise commonly endorsed viewpoint.

Figure 4:
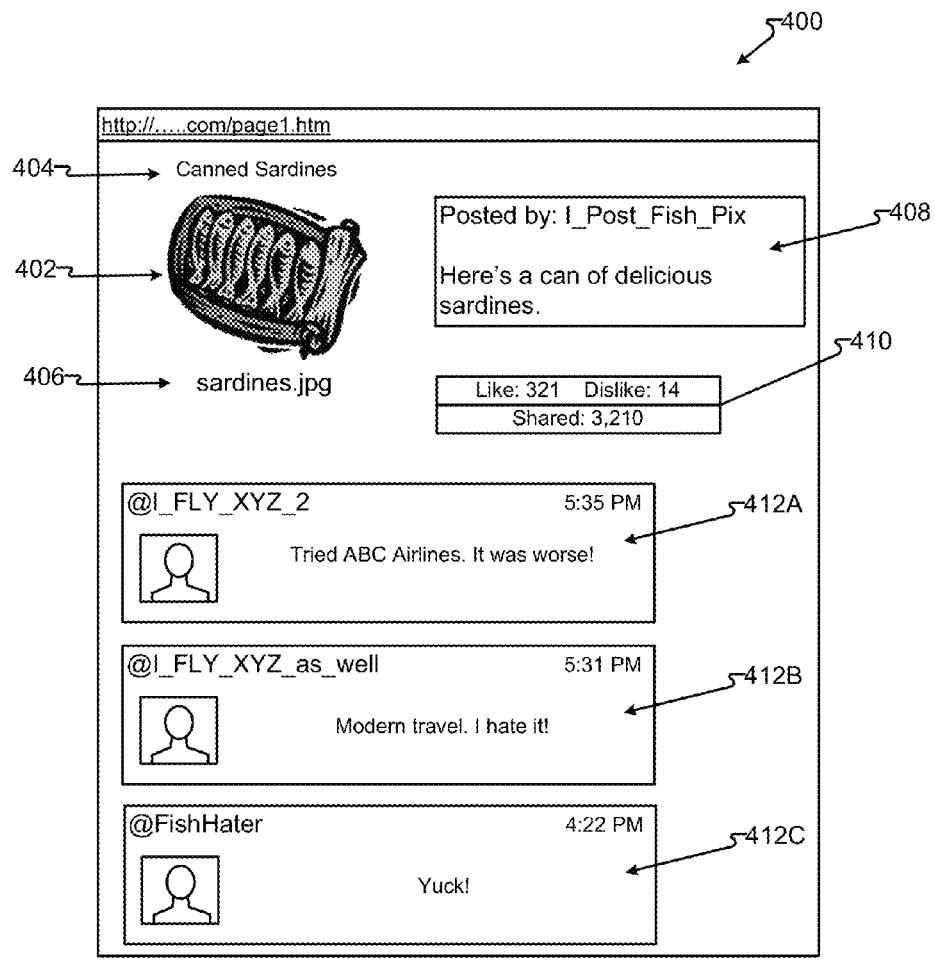
FIG. 4 is a web page illustrating context of a message in accordance with embodiments of the present disclosure.

FIG. 4 is web page 400 illustrating context of a message in accordance with embodiments of the present disclosure. In one embodiment, web page 400 is accessible via a link, such as link 304 of message 300 and is operable to provide context, and therefore sentiment, for message 300.

Web page 400 includes various features operable to provide context to message 300. Web page 402 includes image 402. Image analysis, including audio and video when image 402 is a multimedia object, may be employed to determine the context of the image itself. However, other aspects of web page 404 can be utilized to determine context via text analysis.

In one embodiment, context may be determined by one or more of image title 404, image file name 406, poster's comments 408, viewer endorsements 410, and comments 412. In another embodiment, time provides a context whereby the number of comments 412 and/or endorsements 410 over a period of time provides a context of severity, agreeability, endorsement or other indicator of sympathy, agreement, support and the like by viewers of web page 400.

Endorsement 410 indicates the number of times a viewer of web page 400 has expressed agreement, or disagreement, support or otherwise propagated the web page 400, and with it, the sentiment expressed by web page 400.

In the example illustrated in FIG. 4, web page 400 includes image 402 and user comments 408. In the embodiment illustrated, sardine image 402 is and comment 408 are neutral or even positive (e.g., "delicious" may be deemed to have a positive sentiment). Message 300 included the subject "XYZ," referring to the name of an airline. A contact center monitoring message 300 and utilizing web page 400 to determine the context of message 300 may understand that, in the domain of air travel, "sardine" is a word with negative sentiment. The word "delicious" may still have a positive sentiment.

Additional context may be provided by comments 412. Comment 412A includes a reference to "ABC," referring to another airline. Accordingly, in the domain of air travel, the identification of another airline may be used to provide context or relevancy to a particular post. Comment 412 includes the word "worse" and therefore, comment 412A may be viewed as having a negative context. Similarly, comment 412B includes the word "hate," also a word with a negative context. Comment 412C, which may have been a comment posted solely in response to image 402, similarly has a word with a negative context.

In another embodiment, the negative context and positive context may be scored, weighted, measured against time, or other algorithm to determine the overall sentiment of web page 400. As a result, web page 400, which is accessed by following link 304 in message 300 indicates that message 300 has a negative context.

In a further embodiment, message 300 alone or with additional messages, may be brought to the attention of a contact center resource for further analysis and/or response.

Figure 5:
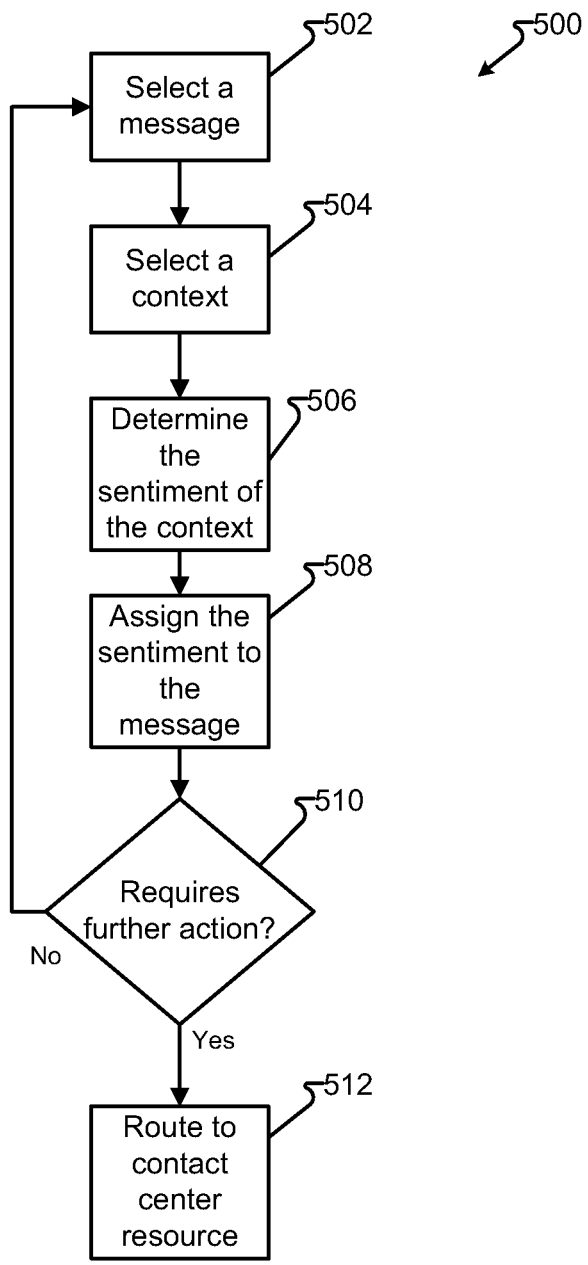
FIG. 5 is a flowchart in accordance with embodiments of the present disclosure.

FIG. 5 is flowchart 500 in accordance with embodiments of the present disclosure. In one embodiment, step 502 selects a message. Step 502 may select a message stored in storage 104, server 108 (e.g., a data storage, a web page, a social media website, email, SMS, etc.), or other source of message data. Step 504 selects a context for the message. The context may be embedded within the message, an identifier of other context information, or both. Any one message may have a plurality of context sources. A source of context may be nested. For example, a message may have a link, the link may have an image, the image may have a comment, the comment may have a link, and so on).

Step 506 determines the sentiment of the context. For example, processor 102 may be executing instructions whereby the relative weight of a set of context is utilized to determine an overall sentiment for the context. The specific algorithm for determining a sentiment from a plurality of context sentiments is a matter of design choice.

Step 508 then assigns the sentiment to the message. The assignment may be associated with a field of the message, an entry in a database, or similar means. Processing of flowchart 500 may stop here. Optionally, flowchart 500 may continue to step 510.

Step 510 determines if further action is required. If no action is required, processing may terminate or continue with the selection of another message at step 502. If step 510 determines additional action is required, processing may continue to step 512 whereby a resource of a contact center is notified. In one embodiment, a spike in the occurrence of a particular subject and negative (or positive) sentiment, may be brought to the attention of human and/or automated contact center resources. Contact center resource may pursue additional analysis, contact one or more posters for additional information and/or resolution, and/or contact a party of interest to alert them to the occurrence of an issue.

In another embodiment, storage 104 preserves the sentiments and/or messages for analysis at another time.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, determining a message sentiment, comprising:
   selecting, by a processor, a message;
   selecting, by the processor, a context associated with the selected message;
   determining, by the processor, a sentiment of the context;
   assigning, by the processor, the determined sentiment to the selected message; and
   wherein the determining the sentiment of the context further comprises, determining the sentiment in accord with an attribute of the context.

2. The method of claim 1, further comprising:
   selecting, by the processor, a plurality of contexts, each associated with the message; and
   setting, by the processor, the sentiment of the message in accord with the plurality of contexts.

3. The method of claim 2, wherein the context includes a rate of occurrence context associated with the plurality of contexts.

4. The method of claim 2, further comprising,
   determining, by the processor, a sentiment score for ones of the plurality of contexts; and
   setting, by the processor, the sentiment of the message in accord with an aggregate sentiment score for the ones of the plurality of contexts.

5. The method of claim 1, wherein the context is associated with a media file and the attribute of the context is at least one of poster comments, title, and viewer comments associated with the media file.

6. The method of claim 5, wherein the viewer comments include an explicit rating indicator.

7. The method of claim 1, wherein the context is an implied endorsement by a viewer of the message.

8. A system for determining sentiment of a message, comprising:
   a processor,
   a storage,
   a network interface, and
   wherein the processor is operable to obtain a message from the storage, the message having an associated context;
   wherein the processor is further operable to determine the sentiment of the context;
   set the sentiment of the message in accord with the sentiment of the context; and
   wherein the processor determines the sentiment of the context by determining the sentiment in accord with an attribute of the context.

9. The system of claim 8, wherein the processor is further operable to utilize the network interface to access at least one of the message and the context of the message.

10. The system of claim 8, wherein the processor is further operable to:
    select a plurality of contexts, each associated with the message; and
    set the sentiment of the message in accord with the plurality of contexts.

11. The system of claim 10, wherein the context includes a rate of occurrence context associated with the plurality of contexts.

12. The system of claim 8, wherein the context is associated with a media file and the attribute of the context is at least one of poster comments, title, and viewer comments associated with the media file.

13. The system of claim 12, wherein the viewer comments include an explicit rating indicator.

14. The system of claim 8, wherein the context is an implied endorsement by a viewer of the message.

15. A system, comprising:
    means for selecting, by a processor, a message;
    means for selecting, by the processor, a context associated with the message;
    means for determining, by the processor, a sentiment of the context;
    means for setting, by the processor, the sentiment of the message in accord with the sentiment of the context; and
    wherein the means for determining the sentiment of the context further comprises, means for determining, by the processor, the sentiment in accord with an attribute of the context.

16. The system of claim 15, wherein the context is associated with a media file and the attribute of the context is at least one of poster comments, title, and viewer comments associated with the media file.

17. The system of claim 15, wherein the context is an implied endorsement by a viewer of the message.

18. The method of claim 1, wherein the context is associated with a media file and the attribute of the context comprises poster comments associated with the media file.

19. The method of claim 1, wherein the context is associated with a media file and the attribute of the context comprises a title associated with the media file.

20. The method of claim 1, wherein the context is associated with a media file and the attribute of the context comprises viewer comments associated with the media file.

* * * * *